United States Patent [19]

Zwemer et al.

[11] Patent Number: 4,620,916

[45] Date of Patent: Nov. 4, 1986

[54] DEGRADATION RETARDANTS FOR ELECTROPHORETIC DISPLAY DEVICES

[76] Inventors: Dirk A. Zwemer, 1033 Jungfrau Ct., Milpitas, Calif. 95035; Solomon I. Beilin, 520 Van Buren Ave., #303, Oakland, Calif. 94610; Long K. Truong, 3627 Tunis Ave., San Jose, Calif. 95132; Lewis T. Lipton, 17660 Vista Ave., Monte Sereno, Calif. 95030

[21] Appl. No.: 777,837

[22] Filed: Sep. 19, 1985

[51] Int. Cl.$^4$ .................... B03C 5/00; C25D 1/12; C25D 13/00
[52] U.S. Cl. .................. 204/299 R; 204/299 EC; 340/787; 350/362
[58] Field of Search .............. 350/362; 340/787; 204/299 EC, 299 R, 299 PE

[56] References Cited

U.S. PATENT DOCUMENTS

| | | | |
|---|---|---|---|
| 3,668,106 | 6/1972 | Ota | 204/299 R |
| 3,892,568 | 7/1975 | Ota | 96/1.3 |
| 4,039,255 | 8/1977 | Yamashita | 204/299 PE |
| 4,041,481 | 8/1977 | Sato | 340/324 M |
| 4,093,534 | 6/1978 | Carter et al. | 350/355 |
| 4,203,106 | 5/1980 | Dalisa et al. | 340/787 |
| 4,285,801 | 8/1981 | Chiang | 204/299 R |
| 4,418,346 | 11/1983 | Batchelder | 340/787 |

OTHER PUBLICATIONS

Lim et al., *J. Electrochemical Soc.*, vol. 123, No. 6, Jun. 1976, pp. 837–838.
Lim et al., *Appl. Phys. Lett.*, vol. 28, No. 9, May 1, 1976, pp. 478–480.
Lim et al., *J. Electrochemical Soc.*, vol. 124, No. 9, Sep. 1977, pp. 1389–1394.

*Primary Examiner*—Arthur P. Demers

[57] ABSTRACT

Degradation retardants reduce electrochemical degradations and provide significantly increased operation lifetimes for the colloidal suspensions of electrophoretic display devices. Suitable degradation retardants include redox agents capable of being repeatedly, reversibly oxidized and reduced in the colloidal suspensions.

24 Claims, No Drawings

4,620,916

DEGRADATION RETARDANTS FOR ELECTROPHORETIC DISPLAY DEVICES

FIELD OF THE INVENTION

The present invention relates generally to electrophoretic display devices, and more particularly to additives dissolved in the colloidal suspensions of electrophoretic display devices which retard the degradation of the suspensions and increase suspension lifetimes.

BACKGROUND OF THE INVENTION

A cathode ray tube is now widely used as an electric display apparatus because of its high speed and ease of scanning. Cathode ray tubes, however, are bulky and may not be practical for portable devices such as portable computers. Furthermore, high voltages are required for operating cathode ray tubes which render such tubes inconvenient for portable devices. It is also difficult to produce a cathode ray tube having a flat display panel. Thus, efforts have been made to develop display devices based upon concepts other than the cathode ray tube.

Transportation of charged particles by means of an applied electric field is commonly known as electrophoresis. Electrophoretic image display (EPD) devices have been proposed as alternatives to the cathode ray tube. An EPD device typically comprises a suspension of pigment particles in a dielectric liquid held between two electrodes, at least one of which is transparent. The pigment particles are charged either positively or negatively. The potential difference applied across the electrodes causes the particles to move towards one or the other electrode. If the pigment particles and the dielectric liquid are of two contrasting colors, the movement of the pigment particles will cause images to be displayed which are visible through the transparent electrode or electrodes. EPD type displays are disclosed in U.S. Pat. Nos. 3,668,106; 3,892,563; 4,041,481; 4,093,534 and 4,203,106. These patents are hereby incorporated by reference to provide the basic information and background on the chemistry and technology of EPD type displays.

Although the concept of a flat-panel, non-emissive electrophoretic display device is particularly promising for applications such as computer terminals, there have been problems in realizing commercially successful display devices based upon electrophoretic principles. Among the problems have been the difficulty of achieving sufficient stability in the electrophoretic cell so as to sustain an acceptable number of switching operations. Chemical reactions in the suspension of the cell adversely affect operating lifetime and the known electrophoretic display devices have generally had a limited useful life.

SUMMARY OF THE INVENTION

It is an object of the present invention to provide electrophoretic display devices having significantly decreased degradation of the working fluid and of the electrodes during operation of the devices.

In one aspect of the present invention, an electrophoretic display device defines an enclosed space and includes a first electrode, at least a second electrode, and has a working liquid disposed within the enclosed space with a plurality of particles suspended in the liquid and being movable between positions adjacent the electrodes in response to an electric field applied to the electrodes during operation. An effective amount of a degradation retardant is dissolved in the working liquid to reduce electrochemical degradations. The degradation retardant consists essentially of a redox agent, a redox agent precursor, an inhibitor agent or mixtures thereof.

The redox agent is capable of being reversibly oxidized and reduced during operation of the electrophoretic display device. The redox agent precursor is capable of reacting with free radical species of the working liquid to form the redox agent as a reaction product. The inhibitor agent is capable of reacting with free radical species to terminate chemical chain reactions during operation of the electrophoretic display device.

Effective amounts of degradation retardants are from about 0.001 wt.% to about 10 wt.%, with the preferred range being from about 0.01 wt.% to about 1 wt.% with respect to the working liquid of the electrophoretic display device and provide significantly increased operation lifetimes for the suspensions.

DETAILED DESCRIPTION OF THE PREFERRED EMBODIMENTS

Electrophoretic display device suspensions with which the invention is useful include a working liquid having a plurality of particles as a colloidal suspension in the working liquid. The particles are typically pigments such as titanium dioxide, alumina, silica or mixtures thereof and organic particles, such as the yellow pigments from the azo family. Inorganic pigments, in particular titanium dioxide, are usually preferred since titanium dioxide is a white pigment with high light scattering efficiency and is commercially available from a variety of sources.

Most commercially available titanium dioxide particles include trace amounts of other components, such as silicon, sodium, and aluminum. Table I, below, illustrates the surface area and elemental analyses of several suitable commercially available $TiO_2$ particles.

TABLE I

| Manufacturer | Surface Area ($m_2$/g) | %Ti | % Si | % Na | % Al | % Fe |
|---|---|---|---|---|---|---|
| DuPont | | | | | | |
| R-100 | 6.42 | 58.5 | 0.033 | 0.014 | 0.71 | N/A |
| R-900 | 15.60 | 56.3 | 0.10 | 0.012 | 1.9 | 0.017 |
| Kerr McGee | | | | | | |
| CR-800 | 12.35 | 57.2 | 0.061 | 0.009 | 1.7 | 0.024 |

The commercially available pigments may be modified to improve their colloidal stability and increase resistivity to photochemical degradation, as described in U.S. patent application Ser. No. 700,726, filed Feb. 12, 1985, entitled "Compositions and Method for Electrophoretic Display Devices", of common assignment herewith. For example, a thin coating comprising about 0.4 wt.% to about 0.16 wt.% organosilane, such as octadecyltriethoxysilane, and a surfactant, such as sodium sulphosuccinate, with a weight ratio of organosilane to surfactant of from about 1:2 to about 2:1, may desirably be chemically attached to the particles by dispersing the particles in a nonaqueous liquid in which organosilane and surfactant are dissolved at an elevated temperature.

The particles function as a diffuse reflector when the particles are packed on the viewing electrode of an electrophoretic cell. The particles are moved in response to an applied electric field during operation of the cell. Pigment particles of the colloidal suspension usually have a size of about 0.1 microns to about 1.0 microns, more preferably from about 0.2 microns to about 0.4 microns.

The position of one particle group may be changed independently of the other. That is, one can address each group of particles while holding another group of particles in a neighboring well. Thus, when voltages of the appropriate wave forms are applied to the anode, control (or grid) electrodes and cathodes via voltage conducting means, the cells can be used to display desirable images by movement of the particles between positions at the bottom of wells (adjacent the cathodes), at the top of the wells (adjacent the control electrodes) and a position wherein the particles are packed against the anode.

Suitable working, or suspending, liquids are highly insulating, non-aqueous liquids, preferably with a low refractive index, high density, low viscosity and low toxicity. For example, the suspending liquid may be tetrafluorodibromoethane, tetrachloroethylene, m-xylene, diethylphthalate, toluene, and the like.

The suspending liquid includes one or more solubilized dyes to provide the dark, or colored, background image. Azo and anthraquinone dyes are known and useful. The suspensions also can include one or more components as charging agents, dispersants, and the like.

At the voltages with which the displays are addressed, substantially all electrochemical reactions are energetically possible, and the steady-state electrochemical background current is limited only by the bulk conductivity of the colloidal suspensions. This means that the suspension components and electrode materials are subject to undergoing irreversible chemical changes and electrochemical degradations, such as oxidation of the suspending liquid, bleaching of the solubilized dye, reduction of the pigment particles, and electrodes corrosion. These chemical changes and electrochemical degradations cause problems such as sticking of particles to the electrodes, delayed switching, particle redistribution, and ultimately failure of the cell.

For example, dye degradation is a change of the dye color which adversely affects the optical characteristics of the display device since the contrast ratio between particles and dye decreases. Particle sticking is where particles deposit on the electrode during the removal cycle, and particle redistribution or migration is the nonuniformity of particle distribution on the electrode surface. Electrode corrosion, or degradation of the electrode, interrupts electrical continuity and affects the electrical transmission characteristics. Delayed switching is where the response time increases during device operation beyond acceptable limits.

Practice of the invention includes dissolving an effective amount of a degradation retardant in colloidal suspensions as above described to reduce electrochemical degradations of the colloidal suspensions within electrophoretic display devices during operation. Suitable degradation retardants are redox agents, redox agent precursors, inhibitor agents, or mixtures of redox agents, redox agent precursors, and inhibitor agents.

Preferred degradation retardants of the invention are substantially soluble in the working liquid, are an electron donor, an electron acceptor, or a combination of electron donor and electron acceptor, and include nitroaromatic compounds, amino-aromatic compounds, sterically hindered aromatic phenols, thio compounds, phosphites, polyconjugated organic polymers, or mixtures thereof. Particularly preferred degradation retardants are tetramethylpiperidinol, 2,2'-dinitrobiphenyl, N-methylmorpholine, 1,5-dinitronaphthalene, nitroanthracene, nitrobenzene, 2,4,6-tri-t-butylphenol, and N-phenylnaphthylamine.

Effective amounts of degradation retardant in accordance with the invention are from 0.001 wt.% to about 10 wt.%, with the preferred range being from about 0.01 wt.% to about 1 wt.% (with respect to the suspension liquid). Such effective amounts of suitable degradation retardant preferably increases the background current of the suspension liquid (including dissolved degradation retardant) by less than double the background current with respect to a suspending liquid without the effective amount of degradation retardant.

A redox agent is a material which undergoes reduction at the cathode (negatively-biased electrode) or oxidation at the anode (positively-biased electrode) and thus includes two chemical species since the reduced species formed at the cathode can travel to the anode and be reoxidized, and vice versa. That is, the redox agent is actually a redox couple. It is believed that the steady-state electrochemical background current is preferentially carried by the redox agent in accordance with the invention, which then reduces the possibility that this current will be carried by other suspension components or electrode materials which could undergo irreversible electrochemical degradation processes.

More particularly, suitable redox agents for the present invention are capable of being repeatedly, reversibly oxidized and reduced in the colloidal suspension of electrophoretic display devices, preferably permitting cyclical repeating of oxidation and reduction at least about $10^4$ cycles without significant degradation of the redox couple, and have a reduction potential of from about $-1$ V to about $-2$ V in acetonitrile solvent with 0.05M tetrabutyl ammonium perchlorate as electrolyte, a glassy carbon working electrode, and a Ag:AgCl reference electrode. Most preferably, the reduction potential is about $-1.5$ V.

The suitable redox agents for the present invention are more easily oxidized or reduced than other components of the colloidal suspension, particularly than the dye, and preferably do not adsorb significantly on surfaces of the suspended particles. Preferred redox agents are aromatic compounds, preferably wherein the aromatic ring has a nitro, nitrosyl, amino or hydroxy substituent.

Colloidal suspensions of electrophoretic display devices include free radical chemical species (typically having reactive centers on carbon, nitrogen or oxygen atoms) which can be formed during operation of the devices by oxidation reactions. For example, such free redical chemical species can be as illustrated below.

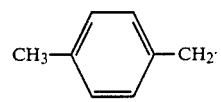

-continued

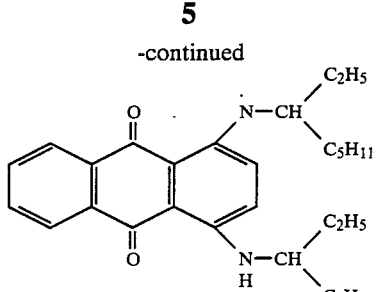

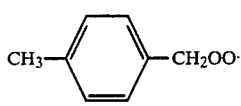

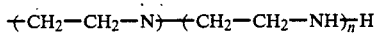

Degradation retardants of the present invention include redox agent precursors which react with such free radical species in-situ to form redox agents, described above, as a chemical reaction product therefrom.

Degradation retardants of the invention also include inhibitor agents which are capable of reacting with free radical species of the colloidal suspensions to terminate chemical chain reactions during operation of the electrophoretic display device. The reaction scheme below illustrates one type of chemical chain reaction (initiation and then propagation) to exemplify chemical chain reactions which are believed to occur during operation of the electrophoretic display devices.

Initiation $$O_2 + e^- \longrightarrow O_2^{-\cdot} \quad \text{(electrochemical)} \quad \text{(a)}$$

$$O_2^{-\cdot} + H_2O \longrightarrow HO_2\cdot + OH^- \quad \text{(b)}$$

Propagation

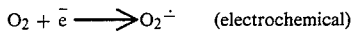

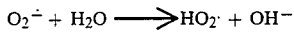

As can be seen from the reaction scheme above, a species in the suspension, such as xylene, is believed to be the recipient of charge transfer which activates the species (that is, it changes to a free radical species). Such a free radical species is believed to then further react with other components of the suspension to cause degradation. Inhibitor agents of the present invention react, or complex, with free radical species in the colloidal suspensions to form a stable product, an inactive free radical form, or a recombination product of the inhibitor agent, and thus prevent or retard chemical chain reactions which cause degradations.

The following experimental methods, materials and results are described for purposes of illustrating the present invention. However, other aspects, advantages and modifications within the scope of the invention will be apparent to those skilled in the art to which the invention pertains.

Several types of electrophoretic cells were prepared and used in the examples described below.

One type of electrophoretic cell (hereinafter "T-cell") represents a simple model of an electrophoretic display device, but with only two electrodes and no control electrode. Another type (hereinafter "NP cell") is similar to the T-cell but has one electrode with an interdigitated line pattern. Another type (hereinafter "Grid cell") has a first electrode (anode) and includes a grid structure having a second electrode (cathode), control electrode, and a dielectric spacer therebetween, and has wells etched into the control electrode and dielectric spacer so as to expose portions of the cathode.

The T-cells were made by separating two metallic coated glass plates by a 50 micron thick epoxy-containing peripheral spacer. The metallic sides of the plates were placed face to face, and the colloidal suspension to be tested was placed within the test cell.

The NP-cells were made by sealing two glass plates together with a 50 μm thick peripheral epoxy spacer. The inside of one surface of the cavity comprises a single, continuous transparent electrode. The second inner surface comprised two electrodes in an interdigitated pattern of thirty six lines of one electrode alternating with thirty six lines of the other. The electrode lines were 330 μm wide and separated by 36 μm. The cavity formed a square one inch on a side.

The Grid cells were made where the front, back and side panels were glass. The external dimensions of each cell were about 230 mm × 180 mm × 10 mm.

Six different types of colloidal suspension systems were prepared for testing having the components described below.

Suspension (1) had m-xylene as dielectric liquid, titanium dioxide particles (R100 with chemically attached organosilane and surfactant) as the pigment particles, PIBSALAC-TEPA as surfactant/dispersant (polyisobutylene succinic-anhydride lactone tetraethylene penta-amine, available from Exxon Paramins Division), calico oil blue ZV as dye ("OBZV", or 1,4-Bis[2-ethylhexyl-amino]anthraquinone, available from Keystone Ingham Corporation) and trace amounts of water.

Suspension type (2) had m-xylene as dielectric liquid, titanium dioxide pigment particles (R100), FC-432 as surfactant/dispersant (polyperfluorobutyl-alpha-fluoroacrilate, or "Fluorad", available from 3M), sodium sulphosuccinate as charge control agent (available from American Cyanimid, Series "AOT"), OBZV as dye, and trace amounts of water.

Suspension type (3) was similar to suspension type (2), but the dielectric liquid was Freon TF (1,1-dichloro, 1-fluoro-2,2-difluoro, 1-chloroethylene, available from DuPont) and OBA as dye (1,4-Bis[i-propylamino]anthraquinone, available from Keystone Ingham Corporation).

Suspension type (4) was similar to suspension (1), but had no surfactant/dispersant in the system. Polysilane was chemically attached to the titanium dioxide particles by chemical reaction via hydroxy groups in hydrocarbon media at elevated temperature.

Suspension type (5) had toluene as dielectric liquid, titanium dioxide particles (R100), vinyltolueneacrilate as surfactant/dispersant ("VTAC" available from Chem. Source), AOT as charge control agent, OBA as dye, and a trace amount of water.

Suspension type (6) was similar to suspension type (1), but tetrachloroethylene was the dielectric liquid and OBA was the dye.

The following examples illustrate the operating lifetimes of control suspensions (without degradation retardants) and compositions in accordance with the present invention. The accelerated operating conditions included operating the cells at elevated temperatures for the colloidal suspensions (60° C.) with continuous switching.

T-cells were tested by applying an alternating square wave potential between the two electrodes, consisting of 50 msec at +70 V and 450 msec at −170 V. A DC potential of 230 V was used in other experiments to measure electrochemical stability. NP-cells were tested by applying an alternating square wave potential between the two co-planar interdigitated electrodes, with the opposing continuous electrode at 0 volts. The cycle consisted of 450 msec at +50 and −50 V for the two co-planar electrode and a reversal of these voltages for 50 msec. The G-cells were tested using full X-Y matrix addressing, comprising the alternate writing and erasing of a full frame of alphanumeric characters.

Examples IA, IB, IC and ID exemplify four different degradation retardants dissolved in suspensions of type (1). Example IB is a particularly preferred embodiment of the invention.

EXAMPLE IA

A control suspension was prepared with 30 mg/cc pigment particles, 2.5 mg/cc surfactant/dispersant, 6 mg/cc dye and 350 ppm of water, all with respect to the dielectric liquid. The inventive composition was as described for the control composition, but included 5 mM/l of 1,5-dinitronaphthalene and 5 mM/l of 2,2'-dinitrobiphenol as degradation retardant.

When the control and inventive compositions were tested in T-Cells (with indium tin oxide as anode and aluminum as cathode), the control composition had a lifetime under accelerated lifetime testing of less than one day. By contrast, the inventive composition had a lifetime of greater than 15 days under the accelerated testing, which is comparable to a three year lifetime under normal operating conditions.

· EXAMPLE IB

A control suspension was prepared with 20 mg/cc pigment particles, 1.25 mg/cc surfactant/dispersant, 17 mg/cc dye and 250 ppm of water, all with respect to the dielectric liquid. The inventive composition was as described for the control composition, but included 1 mg/cc of 1,5-dinitronaphthalene and 1 mg/cc of 2,2'-dinitrobiphenol as degradation retardant.

When the control and inventive compositions were tested in Grid cells (with indium tin oxide as anode and cathode materials and aluminum as grid electrode material), the inventive composition had a lifetime greater than 60 times that of the control.

EXAMPLE IC

A control composition as described for Example IA was prepared; however, the inventive composition included 1 mg/cc nitrobenzene as degradation retardant. These compositions were then subjected to accelerated operating condition testing in Grid-cells (with aluminum as the control electrode and indium tin oxide as cathode and anode material). The control composition had a lifetime of less than one day. By contrast, the inventive composition had an operating lifetime under accelerated testing of greater than 13 days, which is comparable to about three years in normal operating conditions.

EXAMPLE ID

A control composition was prepared as described for Example IA; however, the inventive composition had 1 mg/cc of 2,4,6-tri-t-butylphenol as degradation retardant. The compositions were tested in T-cells with indium tin oxide as anode and cathode materials. The control composition had an operating lifetime under these accelerated conditions of about 15 days, whereas the inventive composition had an operating lifetime under the accelerated testing of about 25 days.

Examples IIA–E exemplify five different degradation retardants dissolved in suspensions of type (2).

EXAMPLE IIA

A control suspension was prepared with 50 mg/cc pigment particles, 1.5 mg/cc surfactant (charge control agent) and 1.0 mg/cc dispersant, 7.0 mg/cc dye and 250 ppm of water, all with respect to the dielectric liquid. The inventive composition was as described for the control composition, but included 1 mg/cc of nitroanthracene as degradation retardant.

When the control and inventive compositions were tested in NP-cells (with alternating voltages at room temperature), the control composition had a lifetime under accelerated lifetime testing of about 10 days ($10^6$ switches). By contrast, the inventive composition had a lifetime of about 40 days under the accelerated testing ($4 \times 10^6$), which is comparable to a four year lifetime under normal operating conditions.

EXAMPLE IIB

A control suspension was prepared as described in Example IIA. The inventive composition was as described for the control composition, but included 1 mg/cc of nitrobenzene as degradation retardant.

When the control and inventive compositions were tested in NP-cells (with alternating voltages at room temperature), the control composition had a lifetime under accelerated lifetime testing of about 10 days ($10^6$ switches). By contrast, the inventive composition had a lifetime of about 33 days under the accelerated testing ($3.3 \times 10^6$), which is comparable to a three year lifetime under normal operating conditions.

EXAMPLE IIC

A control suspension was prepared as described in Example IIA. The inventive composition was as described for the control composition, but included 1 mg/cc of nitroanthracene and 1 mg/cc 2,4,6-tri-tert-butylphenol as degradation retardant.

When the control and inventive compositions were tested in NP-cells (with alternating voltage), the control composition had a lifetime under accelerated lifetime testing of about 10 days ($10^6$ switches). By contrast, the inventive composition had a lifetime of about 30 days under the accelerated testing ($3 \times 10^6$), which is comparable to a three year lifetime under normal operating conditions.

EXAMPLE IID

A control suspension was as described in example IIA. The inventive composition was as described for the control composition, but included 1 mg/cc of nitrobenzene, 1 mg/cc 2,4,6-tri-tert-butylphenol and 1 mg/cc N-phenylnaphthylamine [NPNA] as degradation retardant.

When the control and inventive compositions were tested in NP-cells (with alternating voltage), the control composition had a lifetime under accelerated lifetime testing of about 10 days ($10^6$ switches). By contrast, the inventive composition had a lifetime of about 22 days under the accelerated testing (greater than $2.2 \times 10^6$), which is comparable to a two year lifetime under normal operating conditions.

EXAMPLE IIE

A control suspension was prepared with 52 mg/cc pigment particles, 1.0 mg/cc as surfactant/dispersant, 1.5 mg/cc as charge control agent, 7 mg/cc dye, and 450 ppm water. The inventive composition was as described for the control composition, but included 1.0 mg/cc of 2,4,6-tri-t-butylphenol and 1.5 mg/cc of N-phenylnaphthylamine.

When the control and inventive compositions were tested in NP-Cells (with indium tin oxide as anode and cathode materials), the inventive composition had a lifetime six times that of the control composition.

Examples IIIA, IIIB and IIIC exemplify three different degradation retardants dissolved in suspensions of type (3).

EXAMPLE IIIA

A control suspension was prepared with 50 mg/cc pigment particles, 2.2 mg/cc surfactant/dispersant, 1.5 mg/cc charge control agent, 7 mg/cc dye and about 80 ppm water. The inventive composition was as described for the control composition, but included 1 mg/cc nitroanthracine as degradation retardant.

When the control and inventive compositions were tested in T-cells addressed cyclically at $+70$ V for 50 msec and $-170$ V for 450 msec, the inventive composition had a lifetime almost nine times that of the control.

EXAMPLE IIIB

A control composition as described for IIIA was prepared; however, the inventive composition included 1 mg/cc anthracene as degradation retardant. The inventive composition had an operating lifetime almost 4 times that of the control.

EXAMPLE IIIC

A control suspension was prepared with 52 mg/cc pigment particles, 1.0 mg/cc surfactant/dispersant, 1.0 mg/cc charge control agent, 6 mg/cc dye, and 400 ppm water. The inventive composition was as described for the control composition, but included 0.5 mg/cc of tetramethylpiperidinol as degradation retardant.

When the control and inventive compositions were tested in NP-Cells (with indium tin oxide as anode and cathode), the inventive composition had a lifetime of about 2 and ½ times longer than that of the control.

Example IV exemplifies a degradation retardant dissolved in a suspension of type (4).

EXAMPLE IV

A control suspension was prepared with 40 mg/cc pigment particles, 6 mg/cc dye and 280 ppm water. The inventive composition was as described for the control composition, but included 0.5 mg/cc anthraquinone and 1 mg/cc N-methylmorpholine.

When the control and inventive compositions were tested in NP-Cells (with indium tin oxide as anode and cathode), the inventive composition had a lifetime 15 times that of the control.

Example V exemplifies a degradation retardant dissolved in suspension of type (5).

EXAMPLE V

A control suspension was prepared with 50 mg/cc pigment particles, 1.5 mg/cc surfactant/dispersant, 1.0 mg/cc charge control agent, 6 mg/cc dye and 300 ppm water. The inventive composition was as described for the control composition, but included 4,4-thiobis(6-t-butyl-2-methyl)phenyl as degradation retardant.

When the control and inventive compositions were tested in NP-Cells, the inventive composition had a lifetime five times that of the control.

Example VI exemplifies a degradation retardant dissolved in suspension of type (6).

EXAMPLE VI

A control suspension was prepared with 40 mg/cc pigment particles, 1.25 mg/cc surfactant/dispersant, 4.5 mg/cc dye and 250 ppm water. The inventive composition was as described for the control composition, but included 0.5 mg/cc tetramethylpiperidinol as degradation retardant.

When the control and inventive compositions were tested in Grid-Cells (with indium tin oxide as anode, cathode and control electrode materials), the inventive composition had a lifetime greater than 5 times that of the control.

While the invention has been described in connection with specific embodiments thereof, it will be understood that it is capable of further modification, and this application is intended to cover any variations, uses or adaptations of the invention following, in general, the principles of the invention and including such departures from the disclosure as come within the known or customary practice in the art to which the invention pertains and as may be applied to the essential features hereinbefore set forth, and as fall within the scope of the invention and the limits of the appended claims.

We claim:

1. A method for extending the operating lifetime of electrophoretic display device suspensions comprising:
   dissolving an effective amount of a degradation retardant in a colloidal suspension to reduce electrochemical degradations of the colloidal suspension within an electrophoretic display device during operation thereof, the colloidal suspension including a dielectric liquid, a dye dissolved in the dielectric liquid, and a plurality of pigment particles suspended in the dielectric liquid, the degradation retardant consisting essentially of a redox agent, a redox agent precursor, an inhibitor agent or mixtures thereof, the redox agent capable of being reversibly oxidized and reduced during operation of the electrophoretic display device having the colloidal suspension therein, the redox agent precursor reacting with free radical species of the colloidal suspension to form the redox agent as a reaction product therefrom, and the inhibitor agent capable of reacting with free radical species to terminate chemical chain reactions during operation of the electrophoretic display device having the colloidal suspension therein.

2. The method as in claim 1 wherein the effective amount of degradation retardant is from about 0.001 wt.% to about 10 wt.% with respect to the dielectric liquid of the colloidal suspension.

3. The method as in claim 1 wherein the degradation retardant has a reduction potential of from about −1 V to about −2 V in acetonitrile solvent with 0.05M tetrabutyl ammonium perchlorate as electrolyte, a glassy carbon working electrode, and a Ag:AgCl reference electrode.

4. The method as in claim 1 wherein the degradation retardant is an anti-oxidant.

5. In an electrophoretic display device defining an enclosed space and including a first electrode, at least a second electrode, and a working liquid disposed within the enclosed space, a plurality of particles suspended in the working liquid and being movable between positions adjacent the electrodes in response to an electric field applied to the electrodes during operation, the improvement comprising:
a degradation retardant dissolved in the working liquid and in an amount effective to reduce electrochemical degradation of the working liquid and of the electrodes, the degradation retardant capable of being reversibly oxidized and reduced during operation of the display device and in an amount of from about 0.001 wt.% to about 10 wt.% with respect to the working liquid of the electrophoretic display device.

6. The improvement as in claim 5 wherein the degradation retardant has a reduction potential of from about −1 V to about −2 V in acetonitrile solvent with 0.05M tetrabutyl ammonium perchlorate as electrolyte, a glassy carbon working electrode, and a Ag:AgCl reference electrode, and forms a stable couple.

7. The improvement as in claim 6 wherein the effective amount of degradation retardant is from about 0.01 wt. % to about 1 wt.% with respect to the working liquid.

8. An electrophoretic display composition comprising:
a plurality of pigment particles; and,
a dielectric liquid in which the pigment particles are suspended, the dielectric liquid having a dye and a degradation retardant dissolved therein, the degradation retardant in an amount of from about 0.01 wt.% to about 1 wt.% with respect to the dielectric liquid, the degradation retardant selected from the group consisting of redox agents, redox precursor agents, chemical chain reaction inhibitor agents, and mixtures thereof.

9. The electrophoretic display composition as in claim 8 wherein the redox agents have a reduction potential of from about −1 V to about −2 V with respect to in acetonitrile solvent with 0.05M tetrabutyl ammonium perchlorate as electrolyte, a glassy carbon working electrode, and a Ag:AgCl reference electrode.

10. The electrophoretic display composition as in claim 8 wherein the degradation retardant includes an aromatic ring.

11. The electrophoretic display composition as in claim 10 wherein the aromatic ring has a nitro, nitrosyl, amino or hydroxy substituent.

12. The electrophoretic display composition as in claim 8 wherein the degradation retardant is derived from a nitro-aromatic compound, an amino-aromatic compound, a sterically hindered phenol, a thio compound, a phosphite, a polyconjugated organic polymer, or mixtures thereof.

13. The electrophoretic display composition as in claim 8 wherein the degradation retardant is derived from a nitro, dinitro, amino, or combination of nitro, dinitro and amino, substituted anthracene.

14. The electrophoretic display composition as in claim 8 wherein the degradation retardant is an electron doner, an electron acceptor, or a combination of electron doner and electron acceptor.

15. The electrophoretic display composition as in claim 8 wherein the degradation retardant includes tetramethylpiperidinol.

16. The electrophoretic display composition as in claim 8 wherein the degradation retardant includes 2,2'-dinitrobiphenyl.

17. The electrophoretic display composition as in claim 8 wherein the degradation retardant includes N-methylmorpholine.

18. The electrophoretic display composition as in claim 8 wherein the degradation retardant includes 1,5-dinitronaphtahalene.

19. The electrophoretic display composition as in claim 8 wherein the degradation retardant includes 1,5-dinitronaphthalene and 2,2-dinitrobiphenyl.

20. The electrophoretic display composition as in claim 8 wherein the degradation retardant includes nitroanthracene.

21. The electrophoretic display composition as in claim 8 wherein the degradation retardant includes nitrobenzene.

22. The electrophoretic display composition as in claim 8 wherein the degradation retardant includes 2,4,6-tri-t-butylphenol.

23. The electrophoretic display composition as in claim 8 wherein the degradation retardant includes N-phenylnaphthylamine.

24. The electrophoretic display composition as in claim 8 wherein the degradation retardant includes 2,4,6-tri-t-butylphenol and N-phenylnaphthylamine.

* * * * *